United States Patent [19]

Yajima et al.

[11] 4,122,139

[45] Oct. 24, 1978

[54] METHOD FOR PRODUCING SILICON CARBIDE SINTERED MOLDINGS CONSISTING MAINLY OF SIC

[75] Inventors: Seishi Yajima; Josaburo Hayashi; Mamoru Omori, all of Ohnuki, Japan

[73] Assignee: The Research Institute for Special Inorganic Materials, Asahi, Japan

[21] Appl. No.: 770,715

[22] Filed: Feb. 22, 1977

[30] Foreign Application Priority Data

Feb. 26, 1976 [JP] Japan .................................. 51/19379

[51] Int. Cl.$^2$ ................................................ C04B 35/64
[52] U.S. Cl. ........................................ 264/44; 106/44; 260/42.11; 264/63; 264/65; 264/66; 264/133
[58] Field of Search .................. 106/44; 264/44, 63, 264/65, 66, 133; 260/42.11

[56] References Cited

U.S. PATENT DOCUMENTS

| | | | |
|---|---|---|---|
| 2,691,605 | 10/1954 | Hediger | 423/346 X |
| 3,090,691 | 5/1963 | Weyer | 264/63 X |
| 3,575,916 | 4/1971 | Bockstie | 264/60 X |
| 3,631,139 | 12/1971 | Baver | 264/63 X |
| 3,681,113 | 8/1972 | Yoldas | 264/60 X |

FOREIGN PATENT DOCUMENTS 2,236,078  3/1974  Fed. Rep. of Germany ............ 264/65

Primary Examiner—Thomas P. Pavelko
Attorney, Agent, or Firm—Ladas, Parry, Von Gehr, Goldsmith & Deschamps

[57] ABSTRACT

Silicon carbide sintered moldings having a high strength and a high oxidation resistance at high temperatures are produced by mixing SiC matrix powders with a binder consisting of an organosilicon high molecular weight compound having silicon and carbon as the main skeleton components and containing at least one foreign element other than silicon, carbon, hydrogen and oxygen, molding the mixture into the desired shape and baking the formed molding at high temperatures.

12 Claims, 1 Drawing Figure

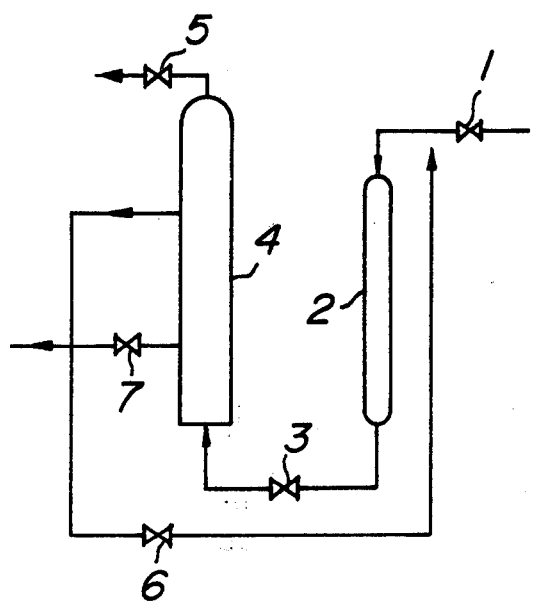

METHOD FOR PRODUCING SILICON CARBIDE SINTERED MOLDINGS CONSISTING MAINLY OF SIC

The present invention relates to a method for producing SiC sintered moldings.

The present invention is improvement of the inventors of U.S. patent application Ser. Nos. 698,453 and 736,659 and aims at the production of the moldings having more excellent strength than the silicon carbide moldings already invented by the same inventors as in this invention.

The object of the present invention is attained by using at least one organosilicon high molecular weight compound selected from organosilicon high molecular weight compounds consisting mainly of carbon and silicon and containing at least one foreign element other than silicon, carbon, hydrogen and oxygen obtained by polycondensation of a mixture of at least one of organosilicon low molecular weight compounds as explained hereinafter with at least one of organometallic compounds containing foreign elements other than silicon, carbon, hydrogen and oxygen through at least one process of heat treatment, if necessary by adding not more than 10% of a radical initiator, irradiation and addition of a catalyst for polycondensation, and a mixture of organosilicon high molecular weight compounds consisting mainly of silicon and carbon with the above described organometallic compounds, as a binder, mixing SiC powders with said binder, molding the resulting mixture and baking the formed molding, whereby the silicon carbide moldings having a higher strength and a higher oxidation resistance at high temperatures because of dispersion of nitrides, oxides, borides or carbides of metals or free carbon in the texture of the silicon carbide moldings consisting mainly of SiC can be produced.

Furthermore, SiC moldings having higher density and strength can be produced by subjecting the thus formed moldings to impregnation treatment by using the above described binder as an impregnating agent.

Then the present invention will be explained in more detail.

A mixture of at least one compound of the following organosilicon low molecular weight compounds classified in the following groups (1)-(9) with at least one compound of the following organometallic compounds classified in the following groups (10)-(18) can be used as the starting material for producing the binder or impregnation agent used in the invention.

(1) Compounds having only Si—C bond:

Silahydrocarbons, such as $R_4Si$, $R_3Si(R'SiR_2)_nR'SiR_3$, carbon-functional derivatives thereof belong to this group.

For example, $(CH_3)_4Si$, $(CH_2=CH)_4Si$, $(CH_3)_3SiC≡CSi(CH_3)_3$, $(CH_3)_5Si(CH_2)_4$, $(C_2H_5)_3SiCH_2CH_2Cl$, $(C_6H_5)_3SiCO_2H$,

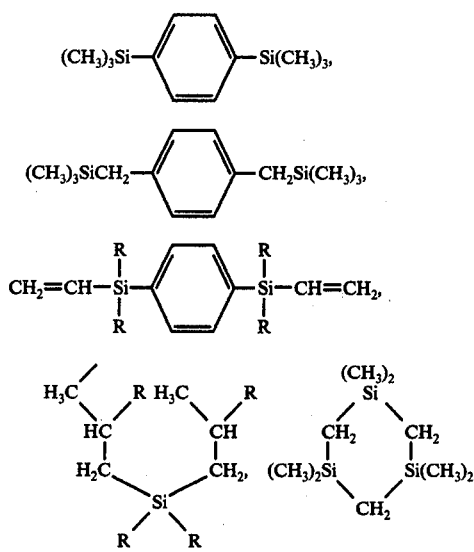

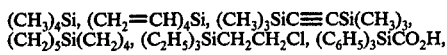

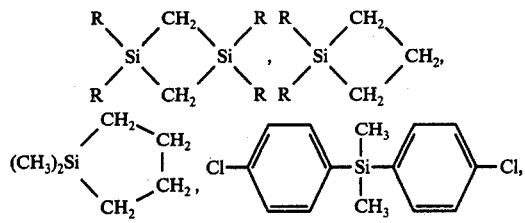

(2) Compounds having Si—H bond in addition to Si—C bond:

Mono-, di-, and triorganosilanes belong to this group.

For example,

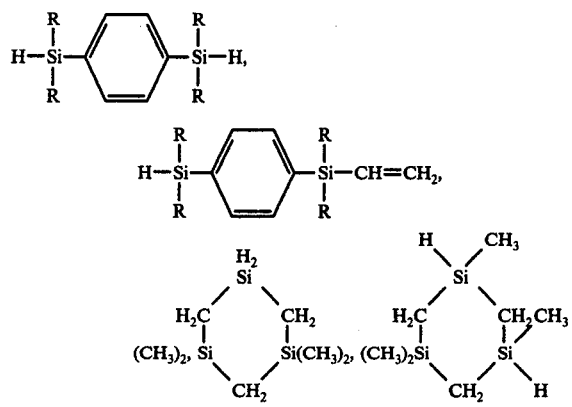

(3) Compounds having Si—Hal bond:

Organohalogensilanes.

For example,

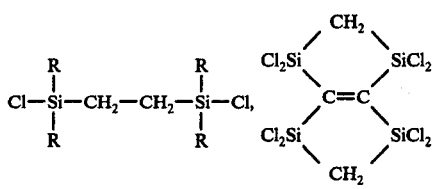

(4) Si—OR organoalkoxy (or aroxy) silanes:

For example, $(CH_3)_2Si(OC_2H_5)_2$, $C_2H_5SiCl_2(OC_2H_5)$,
p-$ClC_6H_4OSi(CH_3)_3$,

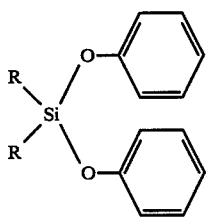

(5) Compounds having Si—OH bond:
Organosilanols.
For example, (C₂H₅)₃SiOH, (CH₃)₂Si(OH)₂,
C₆H₅Si(OH)₃, (HO)(CH₃)₂SiCH₂Si(CH₃)₂ . (OH),

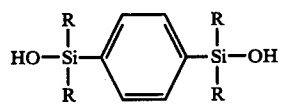

(6) Compounds having Si—Si bond:
For example, (CH₃)₃SiSi(CH₃)₂Cl, (CH₃)₃SiSi(CH₃)₃,
(C₆H₅)₃SiSi(C₆H₅)₂Si(C₆H₅)₂Cl,

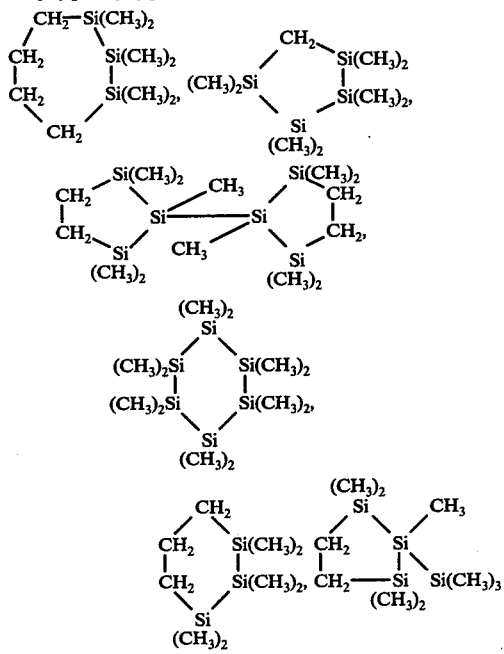

(7) Compounds having Si—O—Si bond:
Organosiloxanes.
For example, (CH₃)₃SiOSi(CH₃)₃, HO(CH₃)₂SiOSi(CH₃)₂OH,
Cl₂(CH₃SiOSi(CH₃)ClOSi(CH₃)Cl₂, [(C₆H₅)₂SiO]₄,
CH₂=C(CH₃)CO₂CH₅Si(CH₃)₂CH₂O₂C(CH₃=CA₂

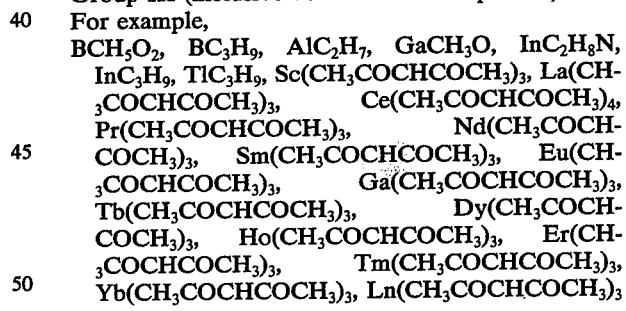

(8) Esters of organosilicon compounds:
Esters formed from silanols and acids.
For example,
(CH₃)₂Si(OCOCH₃)₂

(9) Peroxides of organosilicon compounds:
For example,
(CH₃)₃SiOOC(CH₃)₃, (CH₃)₃SiOOSi(CH₃)₃
In the above described groups (1)–(9), R represents an alkyl group or an aryl group.

(10) Organometallic compounds containing nitrogen:
For example, (C₂H₅)₃SiNH₂, (CH₃)₃SiNHSi(CH₃)₃, (CH₃)₃Si(CN),
(CH₃)₃SiNCO, (CH₃)₃SiNCS

(11) Organometallic compounds containing a metal of Group I (inclusive coordination compounds):
For example,
CH₃Li, C₂H₅Na, C₂H₅Li, Na[(CH₃)₂Li], KCH₃, AgCH₃, AuC₃H₇,

(12) Organometallic compounds containing a metal of Group II (inclusive coordination compounds):
For example,
BeC₂H₆, MgCH₂, CaC₂H₆, BaC₂H₆, ZnC₄H₁₀, CdC₂H₆, HgCH₃Br, SrC₂H₆

(13) Organometallic compounds containing a metal of Group III (inclusive coordination compounds):
For example,
BCH₅O₂, BC₃H₉, AlC₂H₇, GaCH₃O, InC₂H₈N, InC₃H₉, TlC₃H₉, Sc(CH₃COCHCOCH₃)₃, La(CH₃COCHCOCH₃)₃, Ce(CH₃COCHCOCH₃)₄, Pr(CH₃COCHCOCH₃)₃, Nd(CH₃COCHCOCH₃)₃, Sm(CH₃COCHCOCH₃)₃, Eu(CH₃COCHCOCH₃)₃, Ga(CH₃COCHCOCH₃)₃, Tb(CH₃COCHCOCH₃)₃, Dy(CH₃COCHCOCH₃)₃, Ho(CH₃COCHCOCH₃)₃, Er(CH₃COCHCOCH₃)₃, Tm(CH₃COCHCOCH₃)₃, Yb(CH₃COCHCOCH₃)₃, Ln(CH₃COCHCOCH₃)₃

(14) Organometallic compounds containing a metal of Group IV (inclusive coordination compounds):
For example,
HfC₁₀H₁₀Cl₂, GeC₂H₈, SnC₂H₈, PbC₂H₈, TiC₁₀H₁₀, ZrC₁₀H₁₀Cl₂

(15) Organosilicon compounds containing a metal of Group V (inclusive coordination compounds):
For example,
VC₆O₆, NbC₆O₆, TaC₆O₆, C₄H₄N, PC₂H₅O₅, PC₂H₇, AsCH₃S, AsC₂H₇, SbC₂H₇, BiC₃H₉

(16) Organometallic compounds containing a metal of Group VI (inclusive coordination compounds):
For example,
WC₈H₆O₃, C₂H₅SH, SeCH₂, TeC₂H₆, PoC₂H₆, MoC₆H₆, CrC₆H₈N₂O₂

(17) Organometallic compounds containing a metal of Group VII (inclusive coordination compounds):
For example,
$MnC_{12}H_{10}$, $TcC_{10}H_{10}$, $ReC_6H_3O_5$

(18) Organometallic compounds containing a metal of Group VIII (inclusive coordination compounds):
For example,
$FeC_{10}H_{10}$, $CoC_6H_5O_3$, $NiC_6H_{10}$, $RuC_{10}H_{10}$, $RhC_9H_{13}$, $PdC_8H_{10}$, $PdC_5H_5Cl$, $OsC_{10}H_{10}$, $IrC_3O_3$, $PtC_4H_{12}$ At least one of the above described organosilicon compounds selected from the above described groups (1)-(9) is mixed with at least one of the above described organometallic compounds (10)-(18) and the resulting mixture is polycondensed by heating within a temperature range of 200°-1,500° C. or the irradiation of γ-ray, X-ray, UV-ray, electron beam, light and the like, under vacuum or in a gaseous atmosphere selected from an inert gas, hydrogen gas, CO gas, hydrocarbon gas and organosilicon compound gas, if necessary, under pressure to produce the organosilicon high molecular weight compounds containing foreign elements other than silicon, carbon, hydrogen and oxygen, and the produced compounds are used for producing the moldings as the binder as explained hereinafter.

The reason why the above described reaction should be effected within the temperature range of 200°-1,500° C. is as follows. When the temperature is lower than 200° C., the synthesis reaction does not satisfactorily proceed, while when the temperature is higher than 1,500° C., the decomposition reaction is violently caused to produce an SiC compound, so that the temperature range must be 200° to 1,500° C. and best results can be obtained within the temperature range of 300°-1,200° C.

In the above described synthesis reaction, a free-radical initiator of not more than 10% may be added to the above described starting material, if necessary. The free-radical initiators are, for example, benzoyl peroxide, di-tert.-butyl peroxyoxalate, di-tert.-butyl peroxide, azobisisobutyronitrile and the like. The above described synthesis reaction does not always need these free-radical initiators, but this use permits to lower the temperature for starting the reaction by the succeeding heating or to increase a number average molecular weight of the reaction product.

When the amount of the free-radical initiator added is more than 10%, the addition effect is not particularly expected, so that such an amount is uneconomical. Therefore, the amount of the free-radical initiator must be not more than 10% and best results can be obtained within a range of 0.01 to 1%.

When oxygen is present upon heating in the above described synthesis reaction, the free-radical polycondensation reaction does not occur due to oxygen or even if said reaction occurs, the reaction stops in the course, so that the polycondensation reaction must be effected by heating in a gaseous atmosphere selected from an inert gas, hydrogen gas, CO gas, a hydrocarbon gas and an organosilicon compound gas or under vacuum.

In the thermal polycondensation reaction, a pressure is generated, so that it is not always necessary to apply particularly a pressure but when a pressure is applied, such pressure may be applied by means of at least one atmosphere of an inert gas, hydrogen gas, CO gas, a hydrocarbon gas and an organosilicon compound gas.

An embodiment of apparatus for the above described synthesis reaction is a stationary autoclave. In this case, the heating temperature is preferred to be 300°-500° C. Another embodiment for the above described synthesis reaction is shown in FIG. 1. In this drawing, from a valve 1, the starting material is fed into a heating reaction column 2, wherein the heating is effected at a temperature of 300°-1,500° C., preferably 500°-1,200° C. The resulting reaction products including the organosilicon high molecular weight compound containing the foreign elements are discharged from the heating reaction column 2 through a valve 3 and fed into a fractionating column 4 wherein distillation and fractionation are effected. Then, the formed gas is discharged from the column 4 through a valve 5 and a high molecular weight compound is taken out from the column 4 through a valve 7. The low molecular weight compounds fractionated in the column 4 are circulated into the heating reaction column 2 through a valve 6.

The presence of th foreign elements of the organosilicon high molecular weight compounds containing the foreign element to be used as the binder can be confirmed by the infrared absorption spectrum, the nuclear magnetic resonance absorption spectrum and the amount can be determined by the elemental analysis. The average molecular weight was determined by an apparatus for measuring the molecular weight other than this process and as the result the average molecular weight varies according to the starting material, the heating temperature and the heating time and the average molecular weight distributes between 300 and 50,000.

Furthermore, in the present invention, a mixture of the organosilicon high molecular weight compounds obtained by subjecting the organosilicon low molecular weight compounds belonging to the above described groups (1)-(9) to polycondensation reaction through at least one process of irradiation, heat treatment and addition of a catalyst for polycondensation with at least one compound of the above described organometallic compounds belonging to the groups (10)-(18) can be used as the binder. This mixture often may form naturally a compound and therefore the above described "mixture" does not mean only so called mixture of the organosilicon high molecular weight compounds with the organometallic compounds. Furthermore, this mixture may be polymerized for the production of the binder.

In the present invention, when the organosilicon high molecular weight compounds having silicon and carbon as the main skeleton components and containing at least one foreign element other than silicon, carbon, hydrogen and oxygen is used as the binder, said binder is mixed with SiC powders, the resulting mixture is molded and then baked, various microcrystalline metal nitrides, oxides, borides or carbides or free carbon are uniformly and finely dispersed in the texture of the silicon carbide sintered moldings and the silicon carbide sintered moldings having a high strength and a high oxidation resistance at high temperatures can be obtained.

It is advantageous to contain 0.01-20% of the foreign elements other than silicon, carbon, hydrogen and oxygen in the organosilicon high molecular weight compounds to be used as the binder in the present invention. This is because when said amount is less than 0.01%, the amount of the above described various compounds of metals and free carbon dispersing in the texture of the baked silicon carbide moldings is small and it is impossible to obtain the moldings having the aimed high strength, while when said amount exceeds 20%, the density lowers, so that said amount is preferred to be 0.01–20%.

As SiC powders to be used in the present invention, when a high purity is not needed depending upon the application of SiC moldings, commercially available SiC powders can be used.

In order to obtain SiC powders having a relatively high purity, fluorite having a high purity, for example, fluorite having more than 99.8% of $SiO_2$, is reacted with pure carbon, for example, petroleum coke or retort carbon which has less than 0.3% of ash to form SiC powders. In addition, it is advantageous to use SiC powders obtained by baking carbon having a high purity, such as sugar carbon, carbon black and the like and metallic silicon having a high purity. Furthermore, SiC powders obtained by vapor phase decomposition can be used. Particularly, SiC powders obtained by baking the organosilicon high molecular weight compounds to be used in the present invention as disclosed in U.S. patent application Ser. No. 698,453, are preferred as the matrix of the sintered molding of this invention.

The organosilicon high molecular weight compounds to be used as the binder in the present invention are liquid or solid and can be directly used or dissolved in solvents, such as benzene, toluene, xylene, hexane, ether, tetrahydrofuran, dioxane, chloroform, methylene chloride, petroleum ether, petroleum benzine, ligroin, DMSO, DMF and the other solvents capable of dissolving the compounds to form a viscous liquid, which is used.

The binder is added in an amount of 0.3–30%, preferably 1–15% by weight based on SiC powders. The added amount is adjusted by the molding and sintering process as mentioned hereinafter. The resulting mixture is molded into a desired shape. Alternatively, a hot press process wherein the mixture is heated in a mold and the press molding is effected in the course of sintering, can be used.

The sintering of the above described molding is effected by heating said molding at a temperature range from 1,000° C. to 2,200° C. under at least one of atmospheres of vacuum, inert gases, CO gas and hydrogen gas.

If the above heat treatment is effected in an oxidizing atmosphere, such as air, the binder is oxidized to form $SiO_2$, so that such a heat treatment is not preferable.

When by using the above described hot press, the baking is effected under a pressure of 70–20,000 kg/cm$^2$ in at least one atmosphere of vacuum, inert gases, CO gas and hydrogen gas, the conversion of the binder into SiC can be increased and the SiC sintered molding having a higher strength can be formed. Furthermore, when the baking is effected under vacuum, if the heating temperature is raised by spending a sufficient time, the conversion rate of the binder into SiC is increased and the shrinkage of the molding is uniformly carried out, so that the molding having a high strength can be obtained.

A detailed explanation will be made with respect to the course of self sintering of SiC upon the production of SiC sintered moldings. The organosilicon high molecular weight compounds used as the binder pass through a fused state in the heat treatment and are thermally decomposed and a part of carbon and hydrogen volatilizes and the mainly remained carbon and silicon react to form SiC, which bonds strongly to the added SiC matrix powders. In this course, when the temperature is gradually raised in a sufficiently long time, the fused liquid organosilicon high molecular weight compound uniformly fills the grain boundary of SiC matrix powders and the volatile components are volatilized with raising temperature and the remained carbon and silicon gradually react and finally becomes SiC and therefore the binder serves to improve the self sintering ability of SiC which is slow in the self diffusion. When the binder to be used in the present invention is converted into SiC, microcrystalline SiC is formed and the size of the crystal grain is usually 30–70 A and the diameter of the crystal grain is far smaller than that of the heretofore known SiC sintered moldings, so that the surface area is considerably larger and the apparent self diffusion coefficient of SiC becomes very large and in SiC sintered moldings of the present invention, the self sintering ability is increased and as the result, the sintered moldings having a high strength can be obtained.

The reason why the microcrystalline silicon carbide grains are formed is presumably based on the following reason. In the course of the thermal decomposition of the binder composed of the organosilicon high molecular weight compounds having silicon and carbon as the main skeleton components and containing at least one foreign element selected from the foreign elements other than silicon, carbon, hydrogen and oxygen, various microcrystalline metal nitrides, oxides, borides, carbides or free carbon are formed and uniformly and finally dispersed in the texture of the silicon carbide sintered molding and concurrently these substances prevent the microcrystals of silicon carbide mainly formed from the organosilicon high molecular weight compounds from growth to the coarse grains.

According to the present invention, the silicon carbide sintered moldings having a higher strength can be obtained by subjecting the thus obtained SiC sintered moldings having a relatively low density to at least one time of the successive treatment as mentioned hereinafter. That is, the above described sintered moldings are firstly immersed in a liquid form or a solution of the same organosilicon high molecular weight compounds as used as the binder in the present invention to impregnate the grain boundary and the pores of the sintered moldings with said liquid. When the impregnation treatment is carried out, if the above described sintered moldings are previously put in a vessel under a reduced pressure and immersed in the above described liquid, the liquid binder can penetrate into the deep portion of the sintered moldings. Furthermore, the impregnation treatment may be effected under high pressures.

Then, the impregnated sintered moldings are heated at a temperature of 1,000°–1,700° C. under atmospheric pressure or high pressures to obtain the sintered moldings having a higher strength.

It is preferable to deeply penetrate the organosilicon high molecular weight compound into the inner portion in the sintered moldings and when a solid or a viscous liquid form of the organosilicon high molecular weight compound is used, it is advantageous to heat said organosilicon compound to form a melted liquid or dissolve said organosilicon compound in a solvent capable of dissolving said compound to form a solution and to immerse the sintered moldings in such a liquid.

The impregnated organosilicon high molecular weight compounds are converted mainly into SiC by heating. This SiC is present at the grain boundary and pores in the SiC matrix sintered molding and the mutual diffusion of this SiC and the sintered molding and the diffusion of free carbon usually remained in the sintered molding, which is formed by heating the organosilicon high molecular weight compounds, provide strong bonding.

The degree of the above described reduced pressure is preferred to be lower than 10 mmHg in order to obtain the sintered molding having a high density.

In order to make the impregnation easy, the organosilicon high molecular weight compounds to be impregnated are dissolved in the solvent capable of dissolving these compounds, for example, benzene, toluene, xylene, hexane, ether, tetrahydrofuran, dioxane, chloroform, methylene chloride, ligroin, petroleum ether, petroleum benzine, DMSO, DMF and the like to form a low viscous liquid, which is used. However, when the above described organosilicon high molecular weight compounds can be satisfactorily impregnated directly or by heating, it is not necessary to use these solvents.

The heat treatment is carried out at a temperature of 1,000°–1,700° C. and the atmosphere is at least one of vacuum, air, oxygen gas, inert gases, CO gas, hydrogen gas, hydrocarbon gas and ozone. However, when the heating is effected under an oxidizing atmosphere, it is advantageous that in order to prevent the oxidation of the impregnated organosilicon high molecular weight compounds, the sintered moldings are preliminarily heated from room temperature to about 1,000° C. under a non-oxidizing atmosphere to convert the impregnated organosilicon high molecular weight compounds into the inorganic material mainly composed of SiC. The above described successive treatment for increasing the density can be repeated, as far as the impregnation can be made.

Then, free carbon which usually remains upon the conversion of the organosilicon high molecular weight compounds into SiC is often contained in the thus obtained SiC sintered moldings and this free carbon possibly lower the strength of the sintered moldings as an impurity. This free carbon can be removed by heating the sintered moldings at a temperature of 600°–1,700° C. under at least one atmosphere of oxygen gas, air, ozone, hydrogen gas, steam, $CO_2$ gas and hydrocarbon gases. Even if the above described baking is effected at a temperature lower than 600° C., carbon cannot be removed, while when the temperature exceeds 1,700° C., the reaction of SiC with the above described gaseous atmosphere becomes excessive, so that such a high temperature is not preferable. The time of the above described baking under the above described atmosphere varies depending upon the baking temperature, the size of the molding and the structure of the baking furnace and when the baking temperature is low, the baking must be effected for a long time, while when the baking temperature is high, the baking time may be short, but when the baking is effected at a low temperature for a relatively long time, an amount of the reaction product of SiC with the gaseous atmosphere is small and a good result can be obtained. For example, when the crucible produced by the present invention is baked at a temperature of 1,000° C. in air to remove free carbon, the baking time is preferred to be from 0.1 to 3 hours.

In the present invention, an amount of the binder added is 0.3–30% by weight as mentioned above and when said amount is less than 0.3% by weight, it is difficult to obtain SiC sintered moldings, while when said amount is larger than 30% by weight, the bulk specific gravity becomes small and the strength lowers and the oxidation resistance lowers upon use at a high temperature, so that an amount of 0.3–30% by weight is necessary. When the hot press process is used, the amount of 1–10% by weight is preferable and in the process wherein the mixture of SiC powders and the binder is press molded and then the molding is baked, the amount of 5–20% by weight is preferable.

In the thus obtained SiC sintered moldings, the used binder finally converts mainly into SiC and a slight amount of microcrystalline metal oxides, carbides, nitrides, borides and free carbon, so that it is prevented to make the silicon carbide grains of the matrix coarse, and therefore SiC sintered moldings having a higher strength and a higher oxidation resistance at high temperatures can be obtained.

The present invention will be explained in more detail.

For a better understanding of the invention, reference is taken to the accompanying drawings, wherein:

FIG. 1 shows a diagrammatic view of an apparatus for producing the organosilicon high molecular weight compounds having silicon and carbon as the main skeleton components, and containing at least one element other than silicon, carbon, hydrogen and oxygen, organosilicon low molecular weight compound.

The following examples are given for the purpose of illustration of this invention and are not intended as limitations thereof.

EXAMPLE 1

Into a three-neck flask of 5 l capacity were charged 2.5 l of anhydrous xylene and 383 g of sodium, and 1 l of dimethyldichlorosilane was dropwisely added thereto little by little under argon atmosphere. After completion of the addition, the resulting mixture was heated and refluxed for 8 hours under argon atmosphere to obtain a precipitate. The precipitate was filtered and then washed with methanol and water to obtain 415 g of white powdery polysilane. In an autoclave, 50 g of the polysilane was reacted with 5 g of hexamethyldisilazane at 450° C. for 20 hours. After completion of the reaction, the reaction product was dissolved in n-hexane and the hexane solution was taken out from the autoclave and filtered. The filtrate was condensed by heating up to 150° C. under vacuum to obtain 22 g of a solid organosilicon high molecular weight compound. 30 g of SiC powder having an average grain size of 600 meshes and a purity of 99.90% was homogeneously kneaded together with 3 g of the above obtained organosilicon high molecular weight compound, and the resulting mixture was press molded into a crucible-shaped molding. The molding was sintered by heating from room temperature to 1,500° C. in 16 hours under a vacuum of $1 \times 10^{-4}$ mmHg to obtain an SiC sintered crucible. The crucible had a bulk density of 2.40 and a flexural strength of 1,650 kg/cm$^2$.

In 40 cc of toluene was dissolved 10 g of the above obtained organosilicon high molecular weight compound, and the resulting toluene solution was poured on the above obtained SiC sintered crucible, which had previously been kept under a vacuum of $1 \times 10^{-3}$ mmHg, whereby the crucible was impregnated with the toluene solution. The impregnated curcible was heated up to 1,500° C. in 18 hours under argon atmosphere and kept at this temperature for 1 hour to obtain a new sintered SiC crucible. This sintered crucible had a bulk density of 2.48 and a flexural strength of 1,650 kg/cm$^2$. The sintered crucible was subjected to one time of the above described successive treatment of impregnation and heating under the same condition as described above. The thus treated crucible had a bulk density of 2.55 and a flexural strength of 2,050 kg/cm². The crucible was further subjected to one time of the successive treatment of impregnation and heating. The thus treated crucible had a bulk density of 2.61 and a flexural stength of 2,500 kg/cm². That is, when the sintered molding obtained by the method of the present invention is repeatedly subjected to a successive treatment of impregnation step with the organosilicon high molecular weight compound and heating step, the bulk density of the sintered molding gradually increases, and a sintered molding having a high strength can be obtained.

When the above obtained crucible, after subjected to a treatment for removing free carbon, was used for dissolving metallic silicon, the life of the crucible was remarkably longer than that of conventional crucible, and the crucible was fit for use at high temperatures.

EXAMPLE 2

Fifty grams of SiC powder having an average grain size of about 450 meshes and a purity of 99.75%, which had been produced from metallic silicon and carbon, was kneaded together with a binder of 5 g of the organosilicon high molecular weight compound obtained in the same manner as described in Example 1, and the resulting mixture was molded into a nozzle in the following manner. That is, the mixture was charged into a graphite mold and gradually heated up to 1,800° C. in 40 hours by means of the high-frequency induction heating method while applying a pressure of 200 kg/cm² by means of a hot press in a vauum ($1 \times 10^{-4}$ mmHg) to obtain the nozzle. The resulting nozzle was a dense SiC nozzle having a bulk density of 2.60 and a flexural strength of 2,100 kg/cm².

Polydimethylpolysilane powder produced from dimethyldichlorosilane was heated up to about 470° C. and reacted at this temperature for 2 hours under atmospheric pressure while refluxing. The resulting melted polycarbosilane was poured on the above described nozzle, which had been kept under a vacuum of $1 \times 10^{-3}$ mmHg, whereby the nozzle was impregnated with the melted polycarbosilane. The impregnated nozzle was heated up to 1,000° C. in 15 hours under argon atmosphere and kept at this temperature for 2 hours. The thus treated crucible was further heated up to 1,400° C. in 8 hours in air and kept at this temperature for 1 hour to obtain a carbon-free nozzle. The newly obtained nozzle had a bulk density of 2.66 and a flexural strength of 2,600 kg/cm².

As described above, when an SiC molding impregnated with an organosilicon compound is firstly heated up to about 1,000° C. under a non-oxidizing atmosphere and then heated at a temperature of 600°–1,700° C. under an oxidizing atmosphere, the density of the SiC moldings can be increased and the free carbon contained in the molding can be removed at the same time.

A ribbon-shaped metallic silicon was produced by the use of the above obtained nozzle. The life of the nozzle was fairly longer than that of a nozzle produced in a conventional manner.

EXAMPLE 3

A mixture of 10 kg of dodecamethylcyclohexasilane and 0.5 kg of hexamethyldisilazane was subjected to a thermal polycondensation reaction by the use of a flow system reaction apparatus shown in the attached figure. The above described mixture preliminarily heated at 120° C. was introduced into a heating reaction column 2 (a pipe heater having a total length of 1.5 m) at a flow rate of 2 l/hr through a valve 1 and heated up to 650° C. therein to produce a nitrogen-containing organosilicon high molecular weight compound. The reaction mixture was fed into a fractionating column 4 and separated therein into gases, low molecular weight compounds and high molecular weight compounds. The gases were exhausted to the exterior of the reaction system through a valve 5, the high molecular weight compounds were taken out from the reaction system through a valve 7, and the low molecular weight compounds were again fed into the heating reaction column 2 through a valve 6 as a recycled raw material. The resulting organosilicon high molecular weight compounds were heated and filtered, and then condensed by heating at 150° C. under vacuum to obtain a solid high molecular weight compound. In 100 cc of n-hexane was dissolved 10 g of the solid high molecular weight compound, and the resulting solution was kneaded together with 90 g of α-SiC powder having a grain size of smaller than 250 meshes. The resulting mixture was dried to remove the n-hexane and then press molded into a cubic of $20 \times 20 \times 20$ mm³. The resulting molding was heated up to 1,300° C. at a temperature raising rate of 50° C./hr under vacuum and kept at 1,300° C. for 1 hour to obtain an SiC molding.

For comparison, polycarbosilane synthesized from polysilane only was used as a binder, and an SiC molding was produced in the same manner as described above.

The above obtained two kinds of SiC moldings were heated at 1,600° C. in air for a the time as shown in the following Table 1 to effect a heat resistance test, and the compression strength of the heated moldings were compared. The obtained results are shown in the following Table 1.

Table 1

|  | Compression strength (kg/cm²) | | | | |
| --- | --- | --- | --- | --- | --- |
|  | 10 hrs. | 20 hrs. | 100 hrs. | 200 hrs. | 300 hrs. |
| Comparative SiC molding | 6,800 | 6,500 | 3,200 | 1,300 | 500 |
| SiC molding of the present invention | 8,200 | 8,200 | 8,000 | 7,700 | 7,000 |

As seen from Table 1, the SiC molding of the present invention, which is produced by using nitrogen-containing organosilicon high molecular weight compound, is very excellent in the heat resistance.

EXAMPLE 4

An organosilicon high molecular weight compound containing chromium and molybdenum was synthesized from a mixture of 10 kg of dimethyldichlorosilane, 500 g of chromium acetate and 500 g of hexacarbonyl molybdenum by the use of an apparatus shown in the attached figure at a temperature of the heating column of 680° C. in the same manner as described in Example 3. The resulting organosilicon high molecular weight compound contained 0.4% of chromium and 0.9% of molybdenum. An SiC molding was produced by the use of this organosilicon high molecular weight compound in the same manner as described in Example 3.

For comparison, an SiC molding was produced from SiC powder and an organosilicon high molecular weight compound synthesized only from dimethyldichlorosilane in the same manner as described above.

The resulting two moldings were heated at 1,600° C. for the time as shown in the following Table 2, and the compression strengths of the heated moldings were compared. The obtained results are shown in the following Table 2.

As seen from Table 2, the SiC molding of the present invention is very excellent in the heat resistance.

Table 2

| | Compression strength (kg/cm²) | | | |
|---|---|---|---|---|
| | 10 hrs. | 50 hrs. | 100 hrs. | 200 hrs. |
| Comparative SiC molding | 4,800 | 4,100 | 3,100 | 1,800 |
| SiC molding of the present invention | 6,500 | 6,300 | 6,000 | 5,700 |

EXAMPLE 5

A mixture of 30 g of chain dimethylpolysilane synthesized from dimethyldichlorosilane and 2 g of titanocene $((C_2H_5)_2TiCl_2)$ was charged into an autoclave, and heated at 400° C. for 30 hours under a pressure of 30 atmospheric pressures under argon atmosphere to obtain 21 g of an organosilicon high molecular weight compound. 50 g of SiC powder was kneaded together with 10 g of the organosilicon high molecular weight compound as a binder, and the resulting mixture was molded into a rod. The rod-shaped molding was heated from room temperature to 1,500° C. in 42 hours under argon atmosphere. The above treated rod-shaped molding had a bulk density of 2.48. Mechanical property and other property of the molding are shown in Table 3. It can be seen from Table 3 that the rod-shaped molding of the present invention is remarkably superior to conventional SiC sintered molding bonded with $Si_3N_4$.

When the above obtained rod-shaped molding was subjected to the same impregnation and heating treatments as described in Example 2, the bulk density of the molding was increased to 2.54, and the mechanical property and oxidation resistance thereof were also improved.

When the rod-shaped molding was used as a heating element, the life is about 50% longer than the life of conventional SiC heating element.

Table 3

| | Molding in Example 5 | Molding obtained by hot pressing in Example 2 | SiC—$Si_3N_4$* sintered molding (conventional molding) |
|---|---|---|---|
| Bulk density | 2.48 | 2.60 | 2.87 |
| Bending strength (kg/cm²) | 1,500 (20° C) | 2,100 (20° C) | 385 (20° C) |
| Young's modulus (kg/cm²) | 29.7 × 10⁵ (20° C) | 48.6 × 10⁵ (20° C) | 11.9 × 10⁵ (21° C) |
| Compression strength (kg/cm²) | 8,200 (20° C) | 14,500 (20° C) | 1,400 (21° C) |
| Oxidation resistance. Weight increase in air at 1,800° C for 60 hours (mg/cm²) | 1.05 | 0.18 | 3.65 |

*Value described in literature

EXAMPLE 6

Dodecamethylcyclohexasilane was charged in an autoclave and heat treated at 400° C. for 36 hours under argon atmosphere to obtain liquid polycarbosilane having an average molecular weight of 1,800. An organometallic compound, silazane, was produced in the following manner. 200 g of ammonia was added to a mixture of 50 g of methyltrichlorosilane and 100 g of methylene chloride, and the resulting mixture was reacted at 40° C. under pressure. Ammonium chloride generated during the reaction was filtered, and the filtrate was condensed to obtain 30 g of liquid silazane. 30 g of SiC powder having an average grain size of b 600 meshes and a purity of 99.90%, which has been obtained by baking the organosilicon high molecular weight compound as disclosed in U.S. patent application Ser. No. 698,453, was thoroughly kneaded together with 5 g of the above obtained liquid polycarbosilane and 0.5 g of the above obtained liquid silazane, and the resulting mixture was press molded into a crucible. The resulting crucible-shaped molding was sintered by heating from room temperature to 1,500° C. in 18 hours under a nitrogen gas flow to obtain an SiC sintered crucible. The SiC crucible had a bulk density of 2.36.

Then, a mixture of 20 cc of the above obtained liquid polycarbosilane and 2 cc of the above obtained liquid silazane was dissolved in 10 cc of toluene, the toluene solution was poured on the above obtained SiC sintered crucible, which had been kept under a vacuum of $1 \times 10^{-3}$ mmHg, to impregnate the SiC crucible with the toluene solution. The impregnated crucible was heated up to 1,500° C. in 18 hours under argon atmosphere and kept at this temperature for 1 hour to obtain a new SiC sintered crucible, which had a bulk density of 2.42. The resulting sintered crucible was further subjected to one time of the successive treatment of impregnation with the above described solution and heating to obtain a new SiC sintered crucible, which had a bulk density of 2.48. The resulting sintered crucible was further subjected to one time of the above described successive treatment of impregnation and heating to obtain a new SiC sintered crucible, which had a bulk density of 2.54 and a flexural strength of 1,850 kg/cm².

When the above obtained SiC sintered crucible, after subjected to a treatment for removing free carbon, was used for dissolving metallic silicon, the life of the crucible was remarkably longer than that of conventional crucible, and the crucible was fit for use at high temperatures.

EXAMPLE 7

Dodecamethylcyclohexasilane was charged in an autoclave and heat treated at 400° C. for 36 hours under argon atmosphere to obtain liquid organosilicon polymer. The organosilicon polymer was dissolved in n-hexane. Acetone was added to the hexane solution to obtain an acetone-insoluble solid organosilicon polymer having an average molecular weight of 3,200. To 30 g of commercially available SiC powder having an average molecular weight of 320 meshes was kneaded together with a binder of a mixture of 0.6 g of the above obtained acetone-insoluble solid organosilicon polymer and 0.1 g of dicobalt octacarbonyl $(CO_2(CO)_8)$, and the resulting mixture was molded into a pipe in the following manner. That is, the mixture was charged into a graphite mold and gradually heated up to 1,750° C. in 42 hours by means of the high-frequency induction heating method by applying a pressure of 200 kg/cm² in a vacuum $(1 \times 10^{-4}$ mmHg) to obtain a pipe. The resulting pipe is an SiC sintered pipe having a bulk density of 2.58 and a flexural strength of 2,000 kg/cm².

When the resulting SiC pipe was subjected to one time of successive treatment of impregnation with polycarbosilane and heating in the same manner as described in Example 6, the bulk density of the SiC pipe was increased to 2.64 and the flexural strength thereof was increased to 2,350 kg/cm².

As described above, according to the present invention, SiC moldings having an improved oxidation resistance and a high flexural strength can be obtained by using, as a binder, an organosilicon high molecular weight compound consisting mainly of carbon and silicon and further containing foreign element other than silicon, carbon, hydrogen and oxygen. It can be expected that the SiC moldings can be utilized as a heat resistant material in various fields.

What is claimed is:

1. In a method for producing SiC sintered moldings, which comprises mixing SiC powders with an organosilicon high molecular weight compound as a binder, molding the mixture into a desired shape and heating the molding at high temperatures sufficient to sinter SiC powders and to decompose the above described organosilicon high molecular weight compound under a non-oxidizing atmosphere to form SiC sintered molding, an improvement comprises using organosilicon high molecular weight compounds having carbon and silicon as the main skeleton components and containing at least one foreign element other than silicon, carbon, hydrogen and oxygen, which are obtained by subjecting a mixture of at least one organosilicon compound selected from the group consisting of
   (1) compounds having only Si—C bond,
   (2) compounds having Si—H bond in addition to Si—C bond,
   (3) compounds having Si—Hal bond,
   (4) Si—OR organoalkoxy (or aroxy) silanes,
   (5) compounds having Si—OH bond,
   (6) compounds having Si—Si bond,
   (7) compounds having Si—O—Si bond,
   (8) esters of organosilicon compounds, and
   (9) peroxides of organosilicon compounds, with at least one organometallic compound selected from the group consisting of
   (10) organometallic compounds containing nitrogen,
   (11) organometallic compounds containing a metal of Group I (inclusive coordination compounds),
   (12) organometallic compounds containing a metal of Group II (inclusive coordination compounds),
   (13) organometallic compounds containing a metal of Group II (inclusive coordination compounds),
   (14) ortanometallic compounds containing a metal of Group IV (inclusive coordination compounds),
   (15) organometallic compounds containing a metal of Group V (inclusive coordination compounds),
   (16) organometallic compounds containing a metal of Group VI (inclusive coordination compounds),
   (17) organometallic compounds containing a metal of Group VII (inclusive coordination compounds), and
   (18) organometallic compounds containing a metal of Group VIII (inclusive coordination compounds), to polycondensation by at least one process of addition of a polycondensation catalyst, irradiation and heat treatment, as the binder.

2. In a method for producing SiC sintered moldings, which comprises mixing SiC powders with an organosilicon high molecular weight compound as a binder, molding the mixture into a desired shape and heating the molding at high temperatures sufficient to sinter SiC powders and to decompose the above described organosilicon compound under a non-oxidizing atmosphere to form SiC sintered molding, an improvement comprises using a mixture of organosilicon high molecular weight compounds having carbon and silicon as the main skeleton components which are obtained by polycondensing at least one organosilicon compound selected from the group consisting of
   (1) compounds having only Si—C bond,
   (2) compounds having Si—H bond in addition to Si—C bond,
   (3) compounds having Si—Hal bond,
   (4) Si—OR organoalkoxy (or aroxy) silanes,
   (5) compounds having Si—OH bond,
   (6) compounds having Si—Si bond,
   (7) compounds having Si—O—Si bond,
   (8) esters of organosilicon compounds, and
   (9) peroxides of organosilicon compounds, by at least one process of addition of a polycondensation catalyst, irradiation and heat treatment, with at least one organometallic compound selected from the group consisting of
   (10) organometallic compounds containing nitrogen,
   (11) organometallic compounds containing a metal of Group I (inclusive coordination compounds),
   (12) organometallic compounds containing a metal of Group II (inclusive coordination compounds),
   (13) organometallic compounds containing a metal of Group III (inclusive coordination compounds),
   (14) organometallic compounds containing a metal of Group IV (inclusive coordination compounds),
   (15) organometallic compounds containing a metal of Group V (inclusive coordination compounds),
   (16) organometallic compounds containing a metal of Group VI (inclusive coordination compounds),
   (17) organometallic compounds containing a metal of Group VII (inclusive coordination compounds), and
   (18) organometallic compounds containing a metal of Group VIII (inclusive coordination compounds), as the binder.

3. A method as claimed in claim 1, wherein said organosilicon high molecular weight compounds to be used as the binder contain 0.01–20% by weight of at least one of foreign elements other than silicon, carbon, hydrogen and oxygen.

4. A method as claimed in claim 2, wherein said mixture to be used as the binder contain 0.01–20% by weight of at least one of foreign elements other than silicon, carbon, hydrogen and oxygen.

5. A method as claimed in claim 1, wherein an amount of said binder is 0.3–30% by weight.

6. A method as claimed in claim 2, wherein an amount of said binder is 0.3–30% by weight.

7. A method as claimed in claim 1, wherein the heating of the molding is effected at a temperature of 1,000°–2,200° C. under at least one atmosphere of vacuum, inert gases, CO gas and hydrogen gas.

8. A method as claimed in claim 2, wherein the heating of the molding is effected at a temperature of 1,000°–2,200° C. under at least one atmosphere of vacuum, inert gases, CO gas and hydrogen gas.

9. A method as claimed in claim 1, wherein the obtained sintered molding is subjected to at least one time of the successive treatment of impregnation treatment of the SiC sintered molding with the organosilicon high molecular weight compound used as the binder and heat treatment of the impregnated SiC sintered molding.

10. A method as claimed in claim 2, wherein the obtained sintered molding is subjected to at least one time of the successive treatment of impregnation treatment of the SiC sintered molding with the organosilicon high molecular weight compound used as the binder and heat treatment of the impregnated SiC sintered molding.

11. A method as claimed in claim 1, wherein the formed SiC sintered molding is heated at a temperature of 600°–1,700° C. under at least one atmosphere of oxygen gas, air, ozone, hydrogen gas, steam, $CO_2$ gas and hydrocarbon gas to remove free carbon contained in the SiC sintered molding.

12. A method as claimed in claim 2, wherein the formed SiC sintered molding is heated at a temperature of 600°–1,700° C. under at least one atmosphere of oxygen gas, air, ozone, hydrogen gas, steam, $CO_2$ gas and hydrocarbon gas to remove free carbon contained in the SiC sintered molding.

* * * * *